Sept. 8, 1964  A. R. MISHKIN ETAL  3,148,070
AROMATIZATION OF POWDERED COFFEE PRODUCTS
Filed Sept. 11, 1961
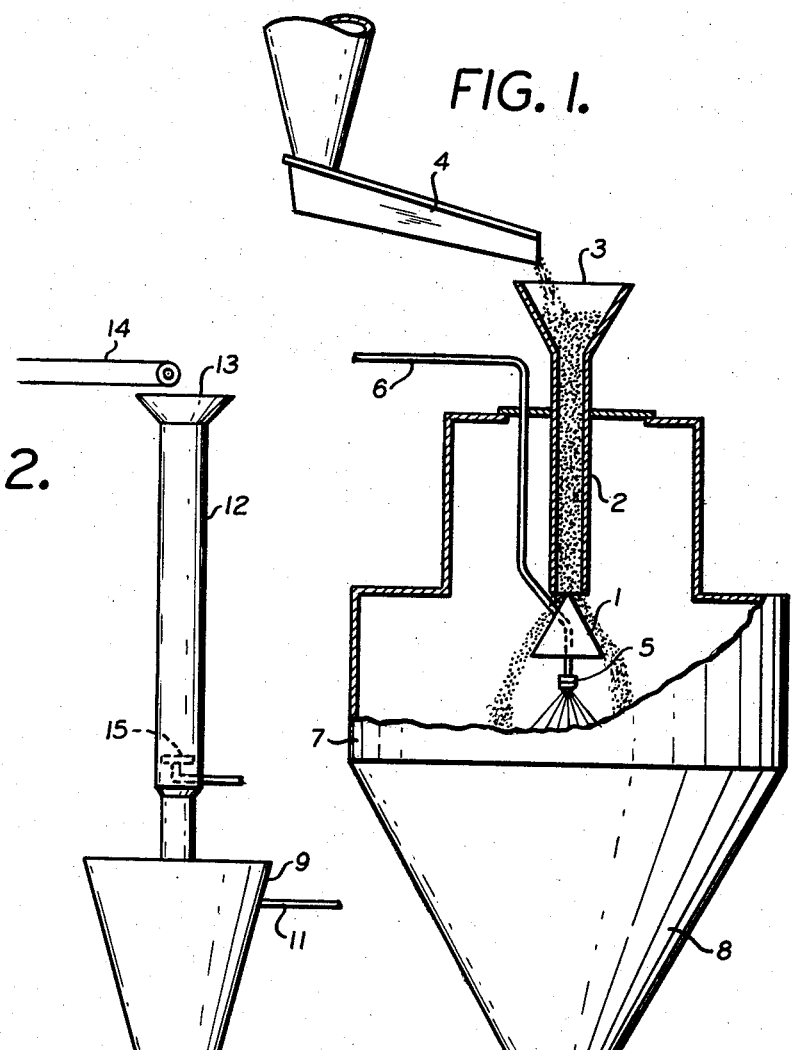
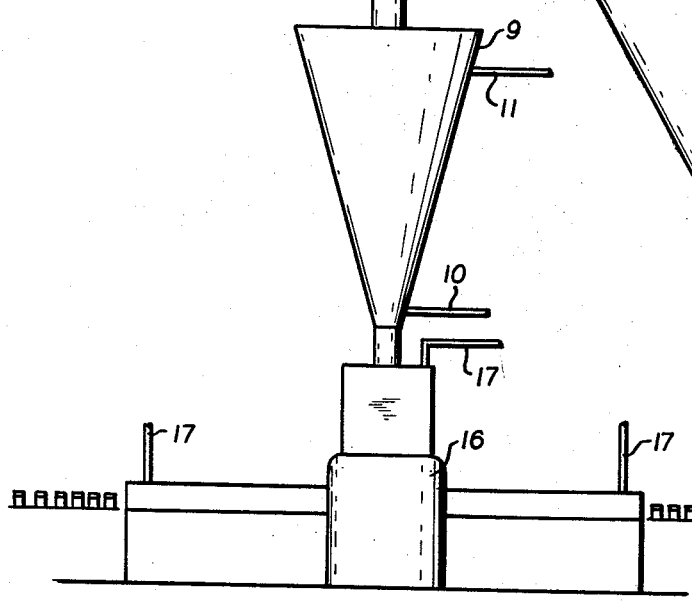
INVENTORS
ABRAHAM R. MISHKIN
WILLIAM MARSH
JOHN WERTHEIM
BY
ATTORNEYS.

United States Patent Office 3,148,070
Patented Sept. 8, 1964

3,148,070
AROMATIZATION OF POWDERED COFFEE PRODUCTS
Abraham R. Mishkin, William C. Marsh, and John H. Wertheim, Marysville, Ohio, assignors to Afico S.A., Lausanne, Switzerland, a corporation of Switzerland
Filed Apr. 11, 1961, Ser. No. 102,240
Claims priority, application Switzerland, Mar. 24, 1961, 3,544/61
8 Claims. (Cl. 99—71)

This invention relates to the production of powdered coffee products, such as "instant" type powdered coffee extracts, having an improved aroma, flavor and keeping quality.

The present invention further provides a method and means for producing aromatized powdered coffee products providing a strong and pleasant coffee aroma upon opening the package containing the same, and during the period of maintenance of the product in the package for subsequent use.

An object of the invention is to provide a method for obtaining natural flavors and aromas from roasted coffee and adding these flavors and aromas to powdered coffee products, e.g. powdered coffee extracts, such as the instant type in order to produce aromatized powdered coffee products having an improved aroma, flavor and keeping quality.

Another object of the invention is to provide a method of separation of the different flavor and aroma components removable from roasted coffee into two or more fractions.

Another object of the invention is to provide a method of collecting, stabilizing and protecting the flavors and aromas after they have been separated from roasted coffee.

Another object of the invention is to provide a method and a device for adding the flavors and aromas uniformly and evenly to powdered coffee products.

Other objects of the invention will be evident from the following description and claims, and from the accompanying drawings.

In carrying out the invention, the volatile substances are removed from roasted coffee by means of a hot gaseous or vaporous medium, the low-boiling fractions are condensed from the resulting vapors at a lower temperature after at least one high-boiling fraction has been removed therefrom by partial condensing, and the last condensate is added together with an oily carrier to the powdered coffee product which is to be aromatized.

Distillation and partial condensing can be effected under normal or reduced pressure. All kinds of powdered coffee products may be aromatized according to the invention, e.g. "instant" type powdered coffee extracts, extracts from mixtures of coffee and other materials, such as chicory, finely ground coffee powders, and mixtures of these products.

Steam is preferably used as the gaseous or vaporous medium for distilling the volatile components. However, this distillation may also be effected by means of hot inert gases, such as carbon dioxide, nitrogen or rare gases.

In carrying out the distillation by means of steam, the stripping can be stopped when the amount of total condensed distillate is 3 to 50% by weight, preferably 5 to 20% by weight of the coffee subjected to distillation.

The partial condensing of the vapors resulting from the distillation aforesaid is preferably carried out by passing the vapors through a condensation system consisting of two or more condensers connected in series, the last of which is operated at a cooling medium, e.g., water temperature of 0 to 15° C. The operating temperature in the first condenser or first group of condensers is preferably chosen so as to provide condensation of 60 to 96% by weight, preferably 80 to 95% by weight, of the total condensed distillate in it or them, and 4 to 40% by weight, preferably 5 to 20% by weight, in the last condenser.

The condensers used may be normal, tubular or plate condensers. It is essential that the time of flow is as short as possible, since the aromatic compounds decompose when held too long at an elevated temperature, e.g. in rectification columns producing a high separation effect.

The aroma fraction obtained in this way, as the last condensate, contains most of the valuable aroma substances, whereas the substances which are contained in the previously separated fractions would not essentially contribute to the aroma or even affect it disadvantageously. Usually, such previously separated fractions are discarded, although such fractions after the removal therefrom of certain undesirable flavors by means of activated charcoal may be utilized in the extraction of coffee with water in the production of coffee extracts.

The oily carrier is intended to fix the aromatic substances onto the coffee product particles. It is preferable to make use of substances naturally occurring in coffee, especially of coffee oil or coffee oil fractions.

Coffee oil may be obtained by expressing coffee or by extracting it therefrom by means of an organic solvent. It may also be obtained from aqueous coffee extracts having a high coffee oil content by mechanical separation, especially centrifugation, or by extraction with an organic solvent.

Instead of coffee oil or coffee oil fractions, use may be made of oily substances foreign to coffee, providing they fulfil the following conditions:
  (1) They must be neutral in aroma and taste.
  (2) They must not disadvantageously affect the solubility or the extractability, respectively, of the coffee product.
  (3) They must have a storing stability which is at least equal to that of the coffee product when stored under the same conditions.

The amount of distillate added to the coffee product to be aromatized is advantageously 0.1 to 0.5% by weight, and that of the coffee oil 0.2 to 1.0% by weight of the coffee product to be aromatized.

The addition of the last condensate and the carrier is preferably effected by intimately mixing together the condensate and carrier, and adding the resultant emulsion to the coffee product. However, aromatization may also be effected by separating the resulting emulsion by means of centrifugation into an aqueous and an oily phase, by discarding the aqueous phase, and by using for aromatization the oily phase only.

Further, it is possible to add the condensate and carrier separately to the coffee product. In this case, it is useful to first add the carrier to the coffee product followed afterwards by the condensate. In this way, a ready and safe fixation of the aromatic substances is secured.

The aromatization of the coffee product and packing of the aromatized product are preferably effected under the exclusion of oxygen, e.g. by adding the last condensate and the carrier to the coffee product in an oxygen-free atmosphere and by immediately filling the aromatized product in an oxygen-free atmosphere into hermetically sealed packages.

The addition of the condensate and carrier may be effected in every possible way which guarantees a fully homogeneous distribution, preferably by spraying. In a preferred embodiment, the liquid is, or the liquids are sprayed against the inside of a falling annular curtain of the powdered coffee product.

Preferably, this is done in a device comprising means for producing a falling annular curtain of the powdered coffee product, and means for spraying the condensate and carrier against the inside of the falling powder curtain.

Two special embodiments of this device are shown, by way of examples, in the drawing, in which:

FIG. 1 is a sectional elevation of a device for carrying out spraying in a normal atmosphere, and FIG. 2 is a side elevation of a device for carrying out spraying and packing of the powder in an inert atmosphere.

The device shown in FIG. 1 comprises as a means for producing an annular powder curtain, a conical distributing surface 1, which is disposed, with its pointed end upwards, at the lower end of a supplying tube 2; the conical distribution surface and the supplying tube are disposed so as to have a common vertical axis. By variation of the annular slit between the conical surface 1 and the lower end of the supplying tube 2, the thickness of the powder curtain, and also the rate of flow, can be varied. The supply tube is enlarged at its upper end into a funnel 3, into which the powder drops from feeding device 4. Underneath the conical distributing surface 1 is disposed a spray nozzle 5 for spraying the aromatizing liquid which is fed through line 6. The means for producing the powder curtain and for spraying the aromatizing liquid are disposed inside a closed chamber 7, which settles into a cone 8.

The spray produced by nozzle 5 may be downwardly inclined, as shown in the drawing, or it may be directed outwards and perpendicularly to the axis.

When the powder is to be aromatized with condensate and carrier as separate components, this can be done by disposing a further spray nozzle underneath spray nozzle 5, shown in the drawing. Preferably, in such case, the carrier is atomized by means of the upper nozzle, and the condensate by means of the lower nozzle.

As an alternative, this may be carried out as follows: in a first device of the shown type the carrier is applied to the powder, and then, in a second device of the same type, the condensate is applied to the powder charged with carrier.

In the embodiment shown in FIG. 2, the means for producing and sprinkling the falling powder curtain, which in this instance incorporates the powder charged with the carrier, correspond to those shown in FIG. 1 and are disposed in a closed chamber 9, in which an overpressure of an oxygen-free atmosphere is produced by means of an inert gas, introduced by line 10. The aromatizing liquid is supplied by line 11. The supplying tube 12 enlarges itself at its upper end into a funnel 13, into which the powder drops from feeding device 14. Near its lower end, supplying tube 12 is provided with a diffusor 15 by which an inert gas is additionally introduced into the powder stream moving downwards in the supplying tube. When leaving supplying tube 12 at its lower end, the powder is essentially oxygen-free. After having been aromatized, the powder is moved directly into packaging machine 16. There, it is packed, under an oxygen-free atmosphere, into packages which are hermetically sealed under the same atmosphere. An inert gas is supplied at several places 17 to the packaging machine, which is of conventional construction.

Any inert gas, e.g. carbon dioxide, nitrogen, rare gases, may be used for the above purpose.

*Example 1*

750 kg. of freshly ground roasted coffee are loaded into an extraction cell of conventional construction. Steam at about 3.5 atmospheres pressure is admitted to the bottom of the cell. After a period of about 9 minutes aromaladen vapors begin to issue from the top of the cell and are led to the bottom of a conventional tubular condenser. The water fed to the jacket of this partial condenser has a temperature of 85° C. The fraction separated in this condenser contains besides water, most of the less volatile high-boiling aromatic substances. The rest of the vapors pass at a temperature of 88 to 100° C., into the final condenser, where the remaining condensable substances are removed. The water fed to the jacket of this condenser has a temperature of 2° C. The portions which are not condensable at this temperature are vented.

Steam distillation is stopped after about 25 minutes from the beginning of steam introduction. During this time, 67.5 kg. of distillate, corresponding to 90% of the total amount of distillate, are separated in the first condenser, and 7.5 kg., corresponding to 10% of the total amount of distillate, are condensed in the second condenser.

The stripped coffee is then extracted, together with other, non-stripped batches, with hot water, in a manner which is well known in the art. The partial condensate is discarded. The second condensate is thoroughly mixed in a mixer with 15 kg. of coffee oil, obtained by expressing roasted coffee, until a smooth emulsion is formed. This mixture is blended, in a device of the type described in FIG. 1, with 3000 kg. of powdered coffee extract. In this way, a powdered coffee extract which is aromatized with 0.25% in weight of the last aroma fraction, and 0.5% in weight of coffee oil is obtained. It already shows on opening the package, a strong and pleasant coffee flavor and aroma.

*Example 2*

Two aroma fractions are obtained from 750 kg. of freshly ground roasted coffee in the same manner as described in Example 1, with the exception that the water temperature in the first condenser is 89° C. In this way, during the distillation, 61 kg. of distillate, corresponding to 81% of the total amount of distillate, are separated in the first condenser, and 14 kg. of distillate, corresponding to 19% of the total amount of distillate, are separated in the second condenser.

Half of the partial condensate is discarded and the rest is treated with 1 kg. of activated charcoal which removes undesirable aromas and flavors. The liquid is then filtered, and the filtrate is added to the water used in the extraction of coffee, or to the extract obtained by such extraction.

The condensate from the final condenser is mixed in a small agitator with 1.5 kg. of coffee oil until a smooth emulsion is formed. This emulsion is separated in a small continuous centrifuge into an aqueous and an oily phase. The aqueous phase is discarded, and the enriched oil is added in a device of the type described in Example 1, to powdered coffee extract to the amount of 0.5%. The coffee extract, aromatized in this way, has a very pleasant aroma and taste.

*Example 3*

This example describes the addition of the aroma substances to the powder and the immediate packaging of the powder in a device of the type described with reference to FIG. 2.

Powdered coffee extract is fed to the supplying tube 12 by means of a belt conveyor 14 from the spray drier at a rate of 500 kg. per hour. Carbon dioxide is introduced into the powder by a diffuser 15 at a rate of 4.3 standard cubic meters per hour. The powder leaves the supplying tube 12 with an oxygen content of less than 0.1% by volume.

The mixing device, which is disposed just beneath and in which the aromatization liquid is blended with the powder, is kept free from oxygen by feeding into it, through line 10, carbon dioxide at a rate of 1.4 standard cubic meters per hour, as well as the hopper of the packaging machine by feeding into it carbon dioxide at a rate of 0.7 standard cubic meter per hour. Carbon dioxide is further added near the inlet and near the outlet sluices of the packaging machine at a rate of 1.4 standard cubic meters per hour on each side.

Jars of an approximate capacity of 240 cubic centimeters are filled in the packaging machine with about 57 g. each of aromatized powdered coffee extract at a rate of about 12,000 jars per hour. Then, still in the oxygen-free atmosphere, glue is applied and the glass jars are sealed with a hermetically closing screw cap.

The coffee extract thus aromatized and packed has a very pleasant aroma and flavor, which do not show any appreciable loss upon being stored for prolonged periods of time.

While there have been described and illustrated preferred embodiments of the present invention, it is apparent that various changes and omissions may be made without departing from the scope and spirit thereof.

We claim:

1. A process for the aromatization of powdered coffee products comprising the steps of stripping the volatile compounds from the roasted coffee by means of a hot gaseous medium to provide said volatile compounds as vapor, separating by partial condensation at a water temperature bewteen 85 and 89° C. at least one high boiling fraction thereof and isolating such condensate, condensing at a water temperature of 0 to 15° C. the remaining low boiling fraction thereof, the total condensate being 5 to 20 percent by weight of the roasted coffee, and adding such last condensate together with an oily carrier to the powdered coffee product, the said oily carrier being neutral in aroma and taste, having a storage stability at least equal to that of the coffee product produced when stored under the same conditions, and having no disadvantageous effect on the solubility and extractability of the coffee product, the amount of condensate added to the powdered coffee product being 0.1 to 0.5 percent by weight of the latter, and the amount of oily carrier added to the coffee product being 0.2 to 1 percent by weight of the latter.

2. A process according to claim 1, wherein the volatile compounds are stripped to form vapor by means of steam.

3. A process according to claim 1, wherein the last condensate is 4 to 40 percent by weight of the total condensate.

4. A process according to claim 1, wherein the last condensate is mixed with the carrier, and the mixture is added to the powdered coffee product.

5. A process according to claim 1, wherein the last condensate and the carrier are mixed to form an emulsion and wherein the emulsion is separated into an aqueous and oily phase, and only the oily phase is added to the coffee product.

6. A process according to claim 1, wherein the carrier is coffee oil.

7. A process according to claim 1, wherein the addition to the last condensate and the carrier to the powdered coffee product is effected in an oxygen-free atmosphere and wherein the thus-treated powdered coffee product is immediately packed in an oxygen-free atmosphere into hermetic packages.

8. A process according to claim 1, wherein the last condensate and the carrier are added to the powdered coffee product by spraying them against the interior of a moving annular curtain of powdered coffee product.

References Cited in the file of this patent

UNITED STATES PATENTS

| | | |
|---|---|---|
| 2,071,846 | Lamb et al. | Feb. 23, 1937 |
| 2,097,914 | Cooper et al. | Nov. 2, 1937 |
| 2,576,952 | Lowe et al. | Dec. 4, 1951 |
| 2,680,687 | Lemonnier | June 8, 1954 |
| 2,738,276 | Blench | Mar. 13, 1956 |
| 2,799,241 | Wurster | July 16, 1957 |
| 2,853,387 | Nutting | Sept. 23, 1958 |
| 2,875,063 | Feldman | Feb. 24, 1959 |
| 2,903,359 | Bonotto | Sept. 8, 1959 |
| 2,947,634 | Feldman et al. | Aug. 2, 1960 |
| 3,035,922 | Mook et al. | May 22, 1962 |

FOREIGN PATENTS

| | | |
|---|---|---|
| 246,454 | Great Britain | Oct. 14, 1926 |